US010288049B2

(12) United States Patent
Tirca-Dragomirescu et al.

(10) Patent No.: US 10,288,049 B2
(45) Date of Patent: May 14, 2019

(54) METHOD AND SYSTEM FOR EFFICIENCY INCREASE IN AN ENERGY RECOVERY DEVICE

(71) Applicant: EXERGYN LIMITED, Dublin (IE)

(72) Inventors: Georgiana Tirca-Dragomirescu, Dublin (IE); Keith Warren, Dublin (IE)

(73) Assignee: EXERGYN LIMITED, Dublin (IE)

( * ) Notice: Subject to any disclaimer, the term of this patent is extended or adjusted under 35 U.S.C. 154(b) by 0 days.

(21) Appl. No.: 15/741,021

(22) PCT Filed: Jun. 29, 2016

(86) PCT No.: PCT/EP2016/065210
§ 371 (c)(1),
(2) Date: Dec. 29, 2017

(87) PCT Pub. No.: WO2017/001521
PCT Pub. Date: Jan. 5, 2017

(65) Prior Publication Data
US 2018/0347551 A1    Dec. 6, 2018

(30) Foreign Application Priority Data

Jun. 30, 2015 (GB) .................................. 1511487.9

(51) Int. Cl.
*F03G 7/06* (2006.01)
*F16J 1/09* (2006.01)

(52) U.S. Cl.
CPC ................ *F03G 7/065* (2013.01); *F16J 1/09* (2013.01)

(58) Field of Classification Search
CPC .................................... F03G 7/065; F16J 1/09
See application file for complete search history.

(56) References Cited

U.S. PATENT DOCUMENTS

| 1,536,951 | A | * | 5/1925 | Trace | ..................... B30B 15/16 100/269.05 |
| 4,027,479 | A | | 6/1977 | Cory | |
| 5,279,123 | A | | 1/1994 | Wechsler et al. | |
| 7,926,565 | B2 | * | 4/2011 | Duan | ..................... E21B 43/082 166/278 |
| 10,036,118 | B2 | * | 7/2018 | Cullen | ..................... D07B 5/00 |
| 2008/0034749 | A1 | * | 2/2008 | Ukpai | ..................... F03G 7/065 60/527 |
| 2010/0102093 | A1 | * | 4/2010 | Ham | ..................... B05B 1/086 239/101 |

(Continued)

FOREIGN PATENT DOCUMENTS

| GB | 2497542 | 6/2013 |
| WO | 2014198904 | 12/2014 |
| WO | 2014198934 | 12/2014 |

*Primary Examiner* — Mark A Laurenzi
*Assistant Examiner* — Shafiq Mian
(74) *Attorney, Agent, or Firm* — Occhiuti & Rohlicek LLP (57) ABSTRACT

The invention provides an energy recovery system comprising a first Shape Memory Alloy (SMAs) or Negative Thermal Expansion (NTE) core and adapted to convert movement of the core into energy in response to a first temperature. Various embodiments are disclosed to include cascaded core arrangements, preheating/cooling of cores and how to decrease the time of reaction for the shape memory alloy in an efficient manner.

20 Claims, 5 Drawing Sheets

(56) References Cited

U.S. PATENT DOCUMENTS

| | | | |
|---|---|---|---|
| 2010/0221124 A1* | 9/2010 | Ikushima | F04B 43/0045 417/44.2 |
| 2013/0015376 A1* | 1/2013 | Kocurek | F16K 31/002 251/11 |
| 2015/0096293 A1* | 4/2015 | Shome | F03G 7/065 60/528 |
| 2016/0208783 A1* | 7/2016 | Cullen | F03G 7/065 |

\* cited by examiner

Figure 2 a) Flow circulation in the bundle b) Expanded view of the bundle mount

METHOD AND SYSTEM FOR EFFICIENCY INCREASE IN AN ENERGY RECOVERY DEVICE

CROSS REFERENCE TO RELATED APPLICATIONS

This application is a National Phase under 35 USC 371 of International Application No. PCT/EP2016/065210 filed on Jun. 29, 2016, which claims priority to United Kingdom Application No. 1511487.9 filed Jun. 30, 2015, the contents of which are hereby incorporated by reference in their entirety.

FIELD

The present application relates to the field of energy recovery and in particular to the use of Shape-memory alloys (SMAs) or Negative Thermal Expansion materials (NTE) for same.

BACKGROUND

Low-grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy is the use of Shape-memory Alloys.

A Shape-memory Alloy (SMA) is an alloy that "remembers" its original, cold-forged shape which once deformed returns to its pre-deformed shape upon heating. This material is a lightweight, solid-state alternative to conventional actuators such as hydraulic, pneumatic, and motor-based systems.

The three main types of Shape-memory Alloys are the copper-zinc-aluminium-nickel, copper-aluminium-nickel, and nickel-titanium (NiTi) alloys but SMAs can also be created, for example, by alloying zinc, copper, gold and iron.

The memory of such materials has been employed or proposed since the early 1970's for use in heat recovery processes and in particular by constructing SMA engines which recover energy from heat as motion. Recent publications relating to energy recovery devices include PCT Patent Publication number WO2013/087490, assigned to the assignee of the present invention. It is desirable to translate the contraction of the SMA or NTE material into a mechanical force in an efficient manner. It is not a trivial task and generally is complicated and involves significant energy losses, as disclosed in patent publication numbers DE3014560 and US2008/034750. A problem with the systems disclosed is that they do not take account of the time of reaction of each core for power production such that the cycle time between heating and cooling of cores can take a long time resulting in inefficient operation. Consequently much of the energy in the working fluid is wasted between heating cycles.

It is therefore an object to provide an improved system and method in an energy recovery device.

SUMMARY

According to the invention there is provided, as set out in the appended claims, an energy recovery system comprising:

a first Shape Memory Alloy (SMAs) or Negative Thermal Expansion (NTE) core and adapted to convert movement of the core into energy in response to a first temperature; and a second Shape Memory Alloy (SMAs) or Negative Thermal Expansion (NTE) core in communication with the first core and adapted to convert movement of the core into energy in response to a second temperature; and wherein a fluid provides a temperature change to activate the first and the second cores and the first and second temperatures to activate the cores correspond to the progressively changing temperature of the fluid and said fluid at a first temperature to activate the first core is used to pre-heat the second core before the fluid is applied at the second temperature to said second core.

The advantage of the invention is to be able to decrease the time of reaction for the shape memory alloy. The invention makes use of cascading the cores to decrease the cycle time and to better utilise the available fluid stream's energy potential, besides utilising the concept for the activation of the SMA elements or wires. The system and the method of the invention improves the effectiveness of the heat transfer in and out of the SMA wires. In other words the invention can be considered as an intelligent heat exchanger that works through the deflection harvested by the transmission.

In one embodiment an additional core is provided between two operating power cores.

In one embodiment the additional core is configured to provide power to at least one control auxiliary system.

In one embodiment the first core is concentrically mounted within the second core and configured to act two separate cores.

In one embodiment the first core comprises an alloy with a different activation temperature to the second core.

In one embodiment there is provided an inlet and outlet for receiving and discharging fluid from a core to define a mixing chamber area where two fluids are present at different temperatures.

In one embodiment if the temperature of the fluid in the mixing chamber area is maintained inside a hysteresis curve the fluid can perform a preheating or a precooling stage of the wires.

In one embodiment the first core comprises a plurality of Shape-Memory Alloy (SMA) or Negative Thermal Expansion (NTE) elongated wires. The plurality of wires can be referred to as a bundle.

In one embodiment the second core comprises a plurality of Shape-Memory Alloy (SMA) or Negative Thermal Expansion (NTE) elongated wires. The plurality of wires can be referred to as a bundle.

In one embodiment at least one of the cores cooperates with a piston with a dome attached to its top surface. The dome is preferably made of a highly conductive material. The dome has paths cut into its surface.

In one embodiment the dome comprises a highly conductive material.

In one embodiment the dome comprises a plurality of channels or path cut into the surface of the dome.

In another embodiment, in order to decrease the cooling load and, in this way, reduce the parasitic load on the system, the stream of cold fluid previously used in a cold cycle can be rerouted to a different warm core with the purpose of precooling of the shape memory alloy and pre-empt a cold cycle. In this way the return temperature to the cooling equipment will be higher, so that the cooling load will be reduced.

In another embodiment there is provided a method of decreasing the reaction time in an energy recovery system, said comprising:

a first Shape-Memory Alloy (SMA) or Negative Thermal Expansion (NTE) core and adapted to convert movement of the core into energy in response to a first temperature; and a second Shape-Memory Alloy (SMA) or Negative Thermal Expansion (NTE) core in fluid communication with the first core and adapted to convert movement of the second core into energy in response to a second temperature; wherein the method comprises the step of:

providing a fluid at a different temperatures to activate the first and the second cores and the first and second temperatures to activate the cores correspond to the progressively changing temperature of the fluid and said fluid at a first temperature to activate the first core is used to pre-heat the second core before the fluid is applied at the second temperature to said second core.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The invention relates to a heat recovery system under development which can use either Shape-Memory Alloys (SMAs) or Negative Thermal Expansion materials (NTE) to generate power from low-grade heat.

Figure 1:
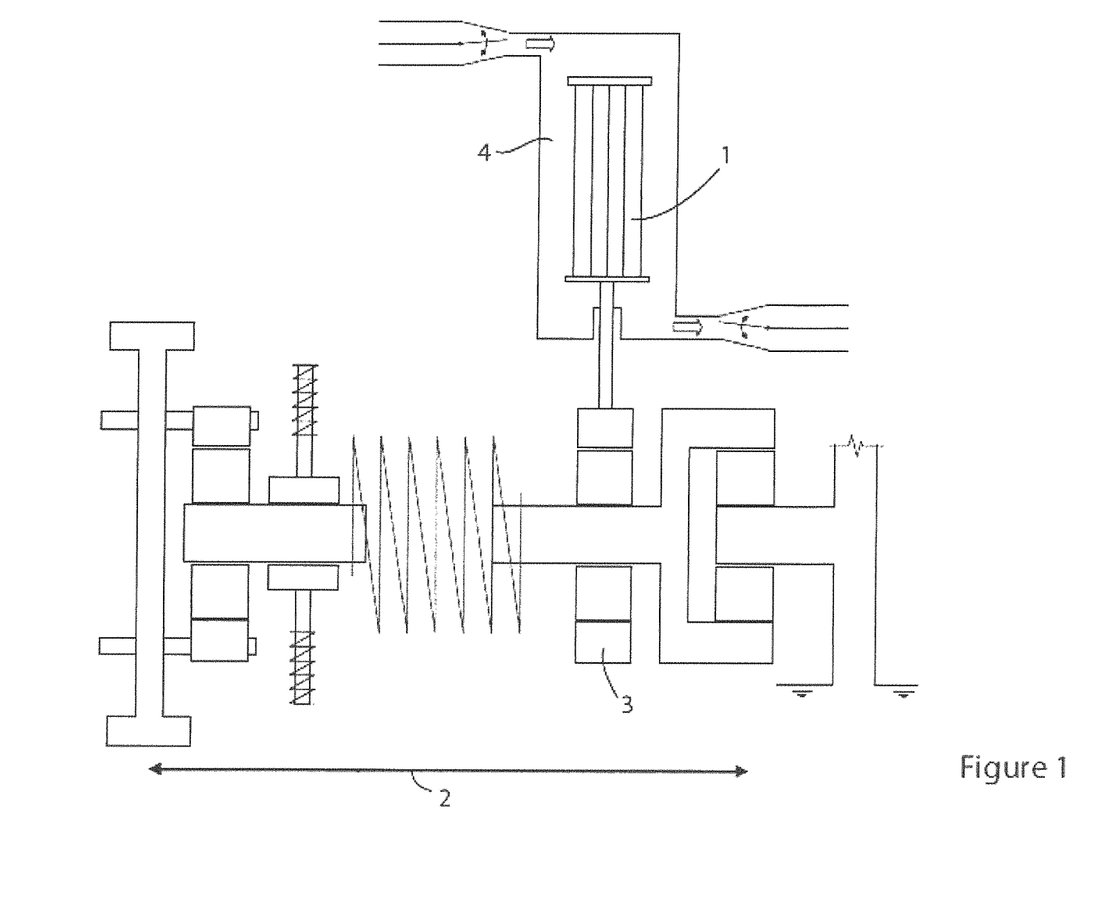
FIG. 1 illustrates a known energy recovery system.

An exemplary known embodiment of an energy recovery device will now be described with reference to FIG. 1 which provides an energy recovery device employing a SMA engine indicated by reference numeral 1. The SMA engine 1 comprises an SMA actuation core. The SMA actuation core is comprised of SMA material clamped or otherwise secured at a first point which is fixed. At the opposing end, the SMA material is clamped or otherwise secured to a drive mechanism 2. Thus whilst the first point is anchored the second point is free to move albeit pulling the drive mechanism 3. An immersion chamber 4 adapted for housing the SMA engine and is adapted to be sequentially filled with fluid to allow heating and/or cooling of the SMA engine. Accordingly, as heat is applied to the SMA core it is free to contract. Suitably, the SMA core comprises a plurality of parallel wires, ribbons or sheets of SMA material. It will be appreciated that in the context of the present invention the term 'wire' is used and should be given a broad interpretation to mean any suitable length of SMA or NTE material that can act as a core.

Typically, a deflection in and around 4% is common for such a core. Accordingly, when a 1 m length of SMA material is employed, one might expect a linear movement of approximately 4 cm to be available. It will be appreciated that the force that is provided depends on the mass of wire used. Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries. It will be appreciated that any suitable SMA or NTE material can be used in the context of the present invention.

Force is generated through the contraction and expansion of the alloy, presented as a plurality of wires (or bundle), within the working core, via a piston and transmission mechanism. Accordingly, depending on the requirements of a particular configuration and the mass of SMA material needed a plurality of SMA wires may be employed together, spaced substantially parallel to each other, to form a single core.

In one embodiment the core reacts when exposed to the hot and cold streams of fluid. The time of reaction is of most importance when trying to improve the efficiency of power production. The present invention proposes a system and method through which the time of reaction for the hot and cold cycles of the system is decreased in duration by providing a pre-heating or cooling step in a chamber.

A cascade arrangement involves the serial connection of cores such that water flowing from the outlet of one core can be sent to the inlet of another core. The purpose of such an arrangement is to increase the efficiency of the system by permitting the maximum recovery of heat from the available source, in this case hot water. In the context of an SMA/NTE engine, in one embodiment this enhanced heat recovery can be achieved by using sequential cores comprised of alloys with different activation temperatures. In another embodiment, cores of the same alloy can be utilised. In a further embodiment, any combination of cores with different alloys can be used (e.g. a plurality of cores with a certain alloy and a separate plurality of cores with a different alloy or alloys). In this way, as the water flows through the core, it activates the sequence of cores at different temperatures, corresponding to the progressively changing temperature of the water.

The cascading of cores is possible only if the alloy contained in the core is capable to withstand the exposure to a fluid of different temperatures in an efficient way, i.e. to be able to change phase completely, hence obtaining the desired usable deflection. There are two possibilities to enable this:

1. To prepare the alloy in such a way (through heat treatments) to have a very narrow hysteresis curve that allows it to react to a progressive colder hot stream/ hotter cold stream.

2. To use alloys with different activation temperatures, corresponding to the sequence of cores to be flooded by the progressive colder heat stream/hotter cold stream.

Figure 2:
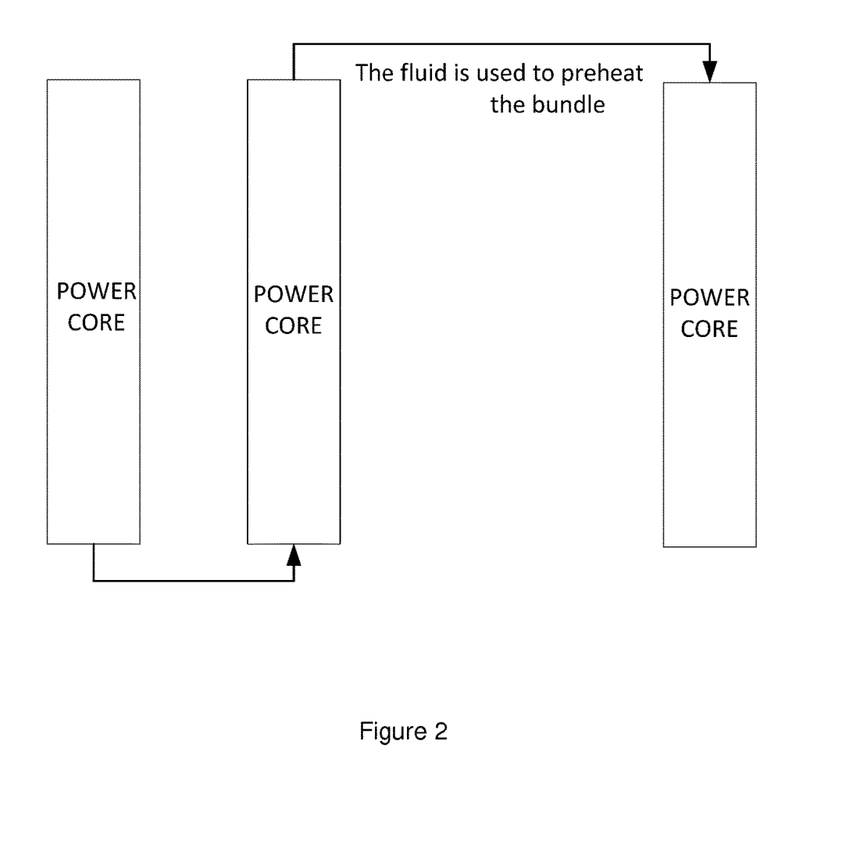
FIG. 2 illustrates a first embodiment of the invention showing a first and second core connected in series.

FIG. 2 illustrates a first Shape-Memory Alloy (SMA) or Negative Thermal Expansion (NTE) core 10 and adapted to convert movement of the core into energy in response to a first temperature and a second Shape-Memory Alloy (SMA) or Negative Thermal Expansion (NTE) core 20 in fluid communication with the first core and adapted to convert movement of the second core into energy in response to a second temperature. The cascade configuration presented in the graphical representation in FIG. 2 is possible only if the activation temperatures of the alloy allows the recirculation of water after exiting the main power producing core in terms of:

a. Being low enough to allow the recirculation in between two main power producing cores to produce a useful output (narrow hysteresis of the alloy);

b. Being high enough to allow the preheating/precooling of the wires in a secondary power core with the fluid exiting a main core (the preheating and precooling concepts are beneficial for the alloy because they allow for a higher efficiency of the heat transfer in the element—the energy needed to change phase is reduced hence the alloy is reacting faster when exposed to a new stream of hot/cold fluid).

The transition temperatures are very important after the shape setting of the wires process is finished, since thermal cycling is shifting the transformation temperatures, so the functioning conditions of the non-cycled wire are completely changed. A safety measure to ensure that the wire is fit to react while cascading two main power cores with the target to obtain a power output is to anneal the as-received wire. This procedure will shift the activation temperatures of the hysteresis curve, so after the settling process, the risk of having not reacting alloy is not as high.

The invention reduces to using at maximum the potential contained by the hot/cold fluid in the power cores. If the temperatures of the fluid streams that flow in the installation are outside the hysteresis curve and have high/low enough values to be cycled through two consecutive power cores the efficiency of the installation will increase significantly. The time of the cycle can be reduced as well if the residual fluid/water exciting the two power cores is used to preheat a third power core.

As indicated above and in FIG. 2 a cascade arrangement involves the serial connection of cores 10, 20, such that water flowing from the outlet of one core can be sent to the inlet of another core. The purpose of such an arrangement is to increase the efficiency of the system, by using better the potential contained by the hot/cold stream.

The present embodiment makes use of a cascade system of FIG. 2 for an SMA/NTE engine, whereby an additional chamber is included in the cascade circuit, between two operating cores. Each core contains an alloy which is configured to activate at temperatures different to the preceding core. This additional core contains an SMA/NTE working element which can be sized and tasked with, but not limited at, providing power for the operation of various parasitic systems such as valves, pumps etc. The power take-off from this core can be mechanical or otherwise.

This embodiment reduces down to using at maximum the potential contained by the hot/cold fluid in the power core and a core for powering auxiliaries components in the system (i.e. valves, pumps etc.). If the temperatures of the streams that flow in the installation are outside the hysteresis curve and have high/low enough values to be cycled through two consecutive cores the efficiency of the installation will increase significantly. The time of the cycle can be reduced as well if the residual water exiting the two power cores is used to preheat a third power core.

The transition temperatures are important after the shape setting of the wires process is finished, since thermal cycling is shifting the transformation temperatures, so the functioning conditions of the non-cycled wire are completely changed. A safety measure to ensure that the wire is fit to react while cascading two cores (main, auxiliary or a combination), with the target to obtain a power output, is to anneal the as-received wire. This procedure will shift the activation temperatures of the hysteresis curve, so after the settling process, the risk of having not-reacting alloy is not as high.

Figure 3:
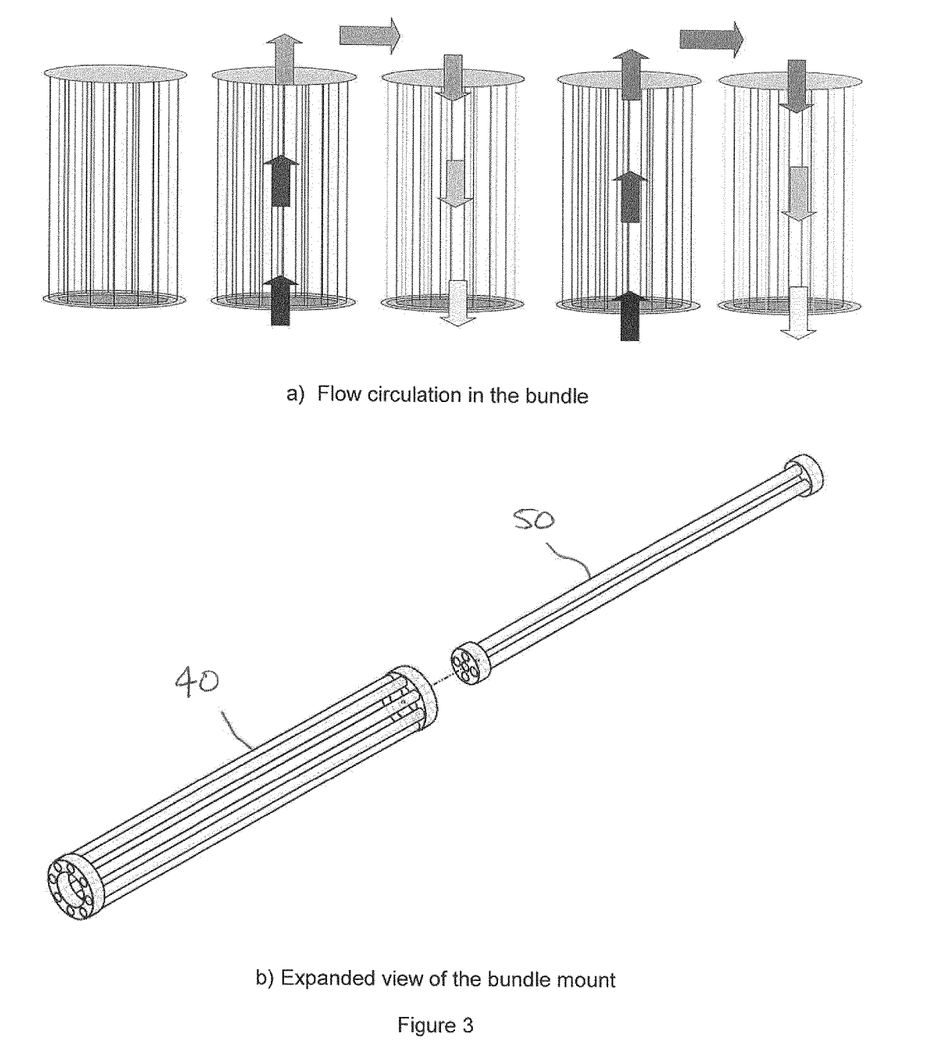
FIG. 3a shows flow circulation in an energy recovery system comprising two cores.
FIG. 3b illustrates an expanded view of FIG. 3b two bundles concentrically mounted in the same core to act as two cores.

FIG. 3a shows flow circulation in an energy recovery system comprising a number of cores shown in cascade.

FIG. 3b illustrates one of the cores of FIG. 3b wherein two bundles are concentrically mounted in the same core to act as two cores. The bundles can comprise of alloys with different activation temperatures with one core capable of slotting into another core.

The activation temperatures of the two types of alloys in the wire bundle cores are as follows:

1. ($M_s$–$M_f$; $A_s$–$A_f$)—Power producing core
2. ($M_{saux}$–$M_{faux}$; $A_{saux}$–$A_{faux}$)—Auxiliary core An auxiliary core is mounted in the centre of the main power core, as shown in FIG. 3b. The relation between the activation temperatures for the two alloys that are used in the main and the auxiliary bundles is as follows:

($M_f$–$M_s$<$M_{faux}$–$M_{saux}$<$A_{saux}$–$A_{faux}$<$A_s$–$A_f$)

The flow path involves two passings of the same stream of fluid through the same combined core. In the first passing of the hot fluid through the core both bundles would be activated and in this way produce work. In the second passing the temperature of the fluid has to be higher than the Austenite finish (Af) temperature of the auxiliary core and smaller than the Austenite start (As) temperature of the main power producing core, so that the full activation of the auxiliary bundle would take place and a precooling of the main bundle's wires would be achieved. The same is true for when the cold fluid is circulated through the combined bundle.

By this design a counterintuitive preheating/precooling of the wires can be applied for the main power producing bundle.

Figure 4:
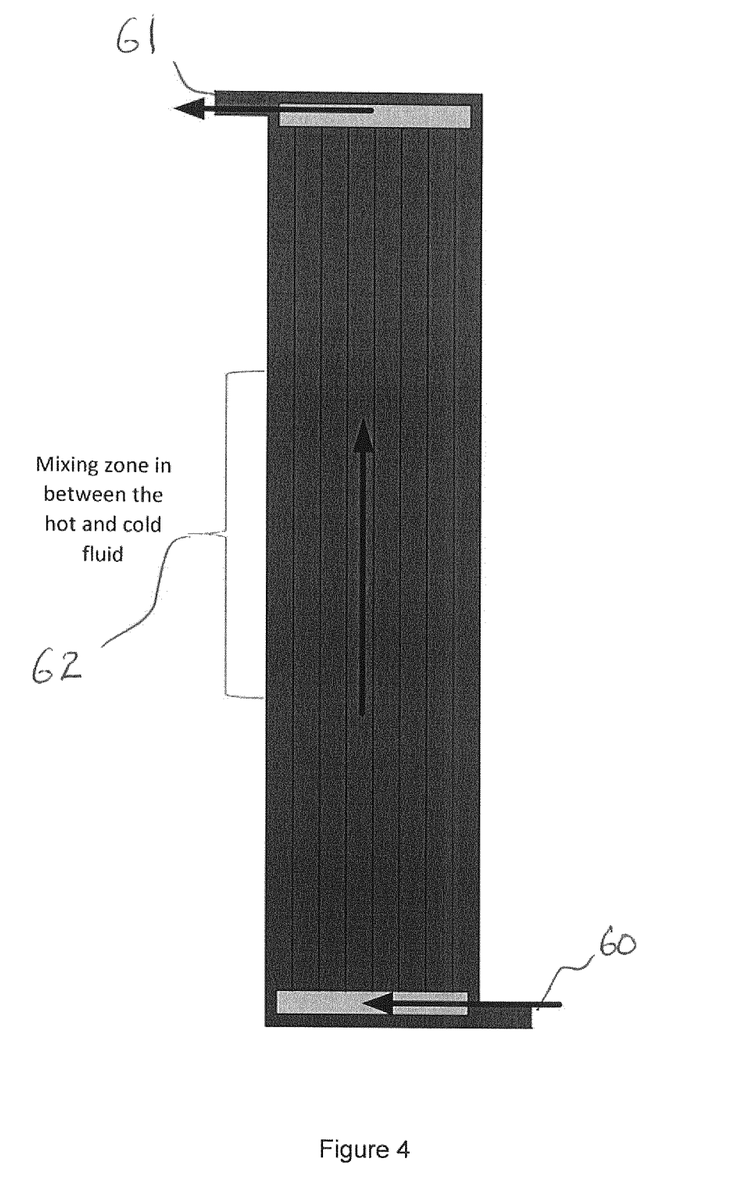
FIG. 4 illustrates an embodiment showing an inlet and outlet for receiving and discharging fluid housing a core where a mixing area is formed in between two fluids at different temperatures.

FIG. 4 illustrates a further embodiment showing an inlet 60 and outlet 61 for receiving and discharging fluid from a core. The hot/cold fluid delivery system is designed in such a way that, for example, hot fluid is never completely flushed from the core while the cold fluid enters the core (the same is applicable with the cold fluid being flushed from the core while hot fluid enters the core), there will always be a mixing area 62 of the two fluids present, in the form of a wave preceding the fluid that enters last in the heat transfer area.

The mixing area 62 is of interest since its temperature is important. If the temperature of the mixing area is maintained inside the hysteresis curve (on the hot and on the cold side) it can perform the preheating and the precooling of the wires before the fresh streams of hot/cold fluids at the optimum temperature levels (outside the hysteresis curve) strike the surface of the wires.

An optimization can be performed to find the optimal temperatures and lengths of the mixing zone to minimize the reaction time of the wires for each core.

This solution is preferred to some embodiments since additional manufacturing of components is not entailed. It will ultimately depend on the regeneration phenomenon being withheld in the cores.

In another embodiment there is provided a method through which the time of reaction for the hot and cold cycles of the system is decreased in duration.

Figure 5:
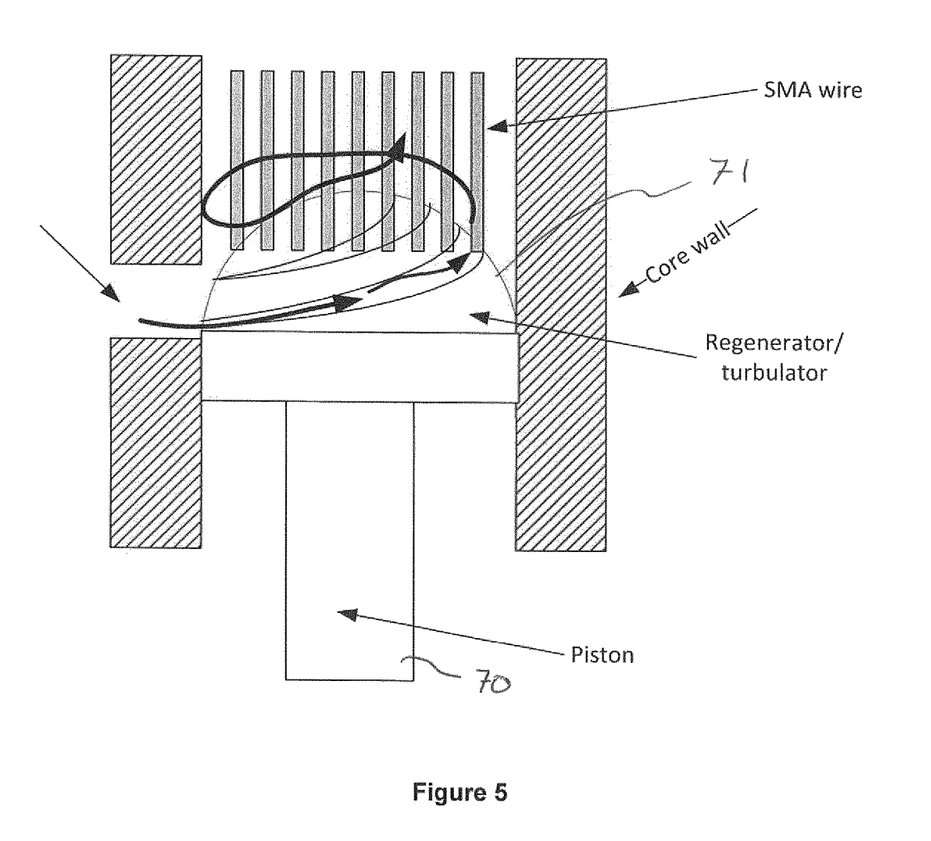
FIG. 5 illustrates a piston with a dome attached to its top surface for use with a core.

A feature which is desirable in the core is a turbulent flow condition. This helps to increase heat transfer between the fluid and wire. FIG. 5 shows an embodiment that can be used to act as a regenerator but also to help promote a swirling flow of the fluid.

FIG. 5 shows a piston 70 with a dome 71 attached to its top surface. The dome is preferably made of a highly conductive material. The dome 71 has paths cut into its surface. These paths provide two purposes. The first is to guide the incoming fluid to create a spiral flow pattern. The second purpose is to increase the area of the dome 71 in contact with the incoming fluid. As a hot fluid enters it will follow the path but also it will transfer heat to the dome material. This causes the hot phase to have a pre-heating phase. When the cool fluid enters the core it will also contact the dome and follow the path. The dome 71 will transfer its heat to the fluid and create a pre-cooling stage.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery system comprising:
  a first Shape-Memory Alloy (SMA) or Negative Thermal Expansion (NTE) core and adapted to convert movement of the core into energy in response to a first temperature;
  a second Shape-Memory Alloy (SMA) or Negative Thermal Expansion (NTE) core in fluid communication with the first core and adapted to convert movement of the second core into energy in response to a second temperature; characterised in that:
  an inlet and outlet is adapted for receiving and discharging a fluid to define a mixing chamber area where two fluids are present at different temperatures for each core;
  wherein the fluids provides a temperature change to activate the first and the second cores and the first and second temperatures to activate the cores correspond to the progressively changing temperature of the fluid and said fluid at a first temperature to activate the first core is used to pre-heat the second core before the fluid is applied at the second temperature to said second core.

2. The energy recovery system as claimed in claim 1 wherein an additional core is provided between two operating power cores.

3. The energy recovery system as claimed in claim 2 wherein the additional core is configured to provide power to at least one control auxiliary system.

4. The energy recovery system as claimed in claim 1 wherein the first core is concentrically mounted within the second core and configured to act two separate cores.

5. The energy recovery system as claimed in claim 4 wherein the first core comprises an alloy with a different activation temperature to the second core.

6. The energy recovery system as claimed in claim 1 wherein if the temperature of the fluid in the mixing chamber area is maintained inside a hysteresis curve the fluid can perform a preheating or a precooling stage of the wires.

7. The energy recovery system as claimed in claim 1 wherein the first core comprises a plurality of Shape-Memory Alloy (SMA) or Negative Thermal Expansion (NTE) elongated wires.

8. The energy recovery system as claimed in claim 1 wherein the second core comprises a plurality of Shape-Memory Alloy (SMA) or Negative Thermal Expansion (NTE) elongated wires.

9. The energy recovery system as claimed in claim 1 wherein at least one of the cores cooperates with a piston with a dome attached to its top surface.

10. The energy recovery system as claimed in claim 9 wherein the dome comprises a highly conductive material.

11. The energy recovery system as claimed in claim 9 wherein the dome comprises a plurality of channels or paths cut into the surface of the dome.

12. The energy recovery system as claimed in claim 10 wherein the dome comprises a plurality of channels or paths cut into the surface of the dome.

13. The energy recovery system as claimed in claim 2 wherein the first core is concentrically mounted within the second core and configured to act two separate cores.

14. The energy recovery system as claimed in claim 3 wherein the first core is concentrically mounted within the second core and configured to act two separate cores.

15. The energy recovery system as claimed in claim 2 wherein the first core comprises a plurality of Shape-Memory Alloy (SMA) or Negative Thermal Expansion (NTE) elongated wires.

16. The energy recovery system as claimed in claim 3 wherein the first core comprises a plurality of Shape-Memory Alloy (SMA) or Negative Thermal Expansion (NTE) elongated wires.

17. The energy recovery system as claimed in claim 4 wherein the first core comprises a plurality of Shape-Memory Alloy (SMA) or Negative Thermal Expansion (NTE) elongated wires.

18. The energy recovery system as claimed in claim 2 wherein the second core comprises a plurality of Shape-Memory Alloy (SMA) or Negative Thermal Expansion (NTE) elongated wires.

19. The energy recovery system as claimed in claim 3 wherein the second core comprises a plurality of Shape-Memory Alloy (SMA) or Negative Thermal Expansion (NTE) elongated wires.

20. The energy recovery system as claimed in claim 4 wherein the second core comprises a plurality of Shape-Memory Alloy (SMA) or Negative Thermal Expansion (NTE) elongated wires.

* * * * *